Patented Nov. 30, 1948

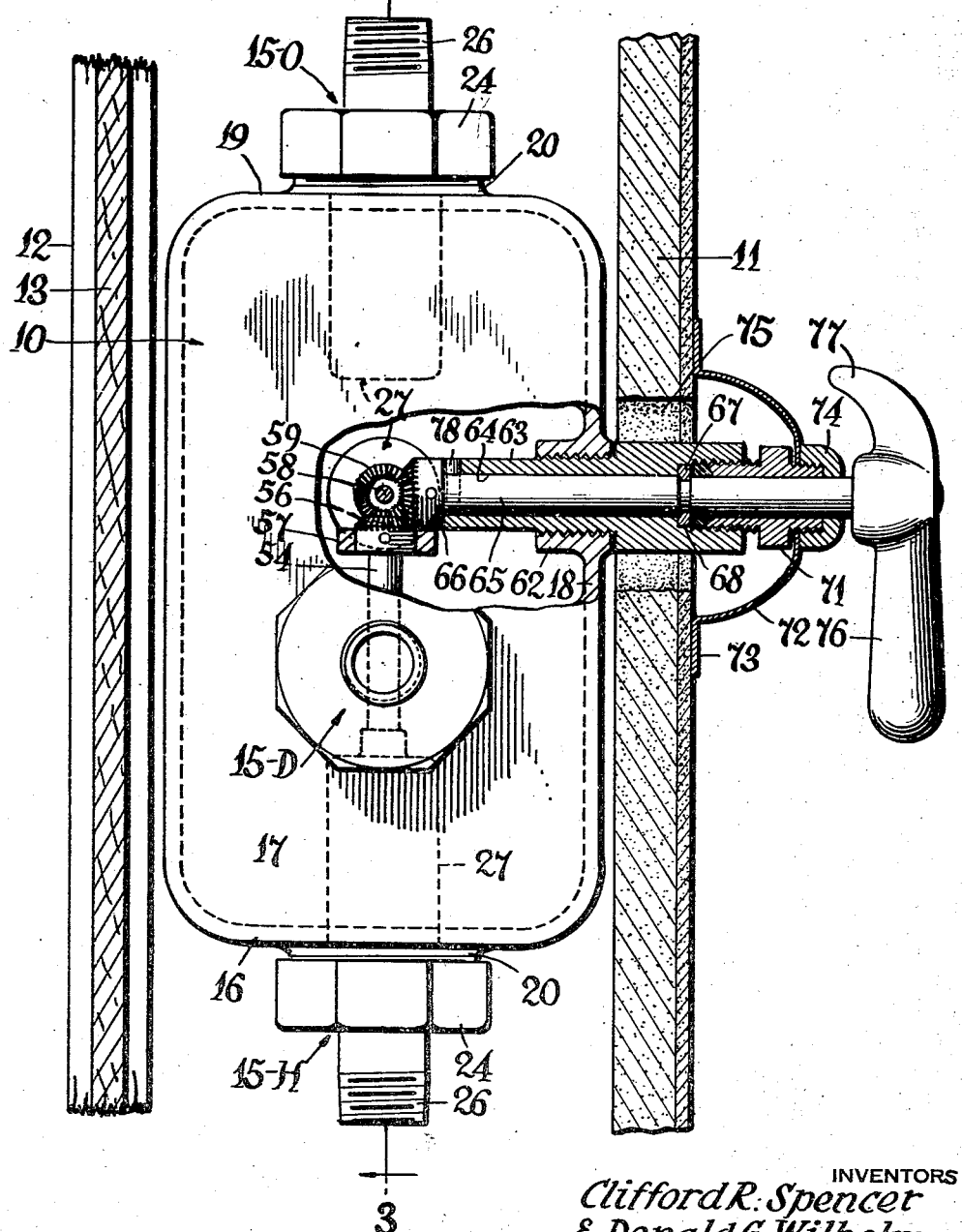

2,455,144

UNITED STATES PATENT OFFICE 2,455,144

MECHANISM FOR EFFECTING THE REGULATION AND AUTOMATIC CONTROL OF THE TEMPERATURE OF BATH WATER

Clifford R. Spencer and Donald G. Wilhelm, Buffalo, N. Y.

Application August 19, 1947, Serial No. 769,500

3 Claims. (Cl. 236—12)

This invention relates to a unitary mechanism for effecting the regulation and automatic control of the temperature of heated water to be used for bath purposes as delivered through a single line and supplied from a hot water line and a cold water line, the several lines being so connected to the mechanism that the water from the hot and cold water sources is "mixed" to the temperature predetermined and desired and so delivered.

In the operational aspect, one object of the invention is to provide an automatically operating mechanism whereby the bath water will not be delivered until it is at the temperature desired and predetermined, as delivered will be so maintained, whatever the higher temperature in the hot water line, so long as the temperature in such line does not fall below a minimum degree, and its delivery will be cut off when, and if, the temperature in the hot water line falls below the degree necessary to maintain the predetermined bath temperature.

Another object, in the operational aspect, is to provide a mechanism having a temperature predetermining feature and having its several components operative in coordinated relation through temperature zone controls in contradistinction to coordinating mechanical connections as heretofore proposed. Thereby the mechanism is of the simplest possible form for the attainment of the objects stated in the preceding paragraph and is free from connecting mechanisms which in the case of an individual derangement adversely effect the coordinated connection of the components and are difficult and expensive to repair. In general, in the attainment of this object, the valves for the regulation of the mixing and delivery operations are operated by temperature responsive devices severally located in different temperature zones whereby a change of temperature in any single zone will directly and individually govern the operation of the valve in that zone, mechanically independently of the other valves, and in relation to the mixing operation as a whole and the ultimate result of maintaining a constant predetermined bath temperature.

In the structural and maintenance aspects the object is to provide the various controlling valves as structurally independent units so constructed and arranged that if, for any reason any valve should require repair or replacement, it may be easily and quickly removed and replaced without disturbing the assembly of the other parts of the mechanism or the arrangement of the mechanism with reference to the several water lines.

In the manufacturing aspect the object is to provide a mechanism composed of the smallest number of parts which, as independent structural units, can be readily and economically assembled, and wherein the valves may be of substantially uniform construction incorporating a standard form of thermostatic element available for use as a controlling medium with any of the valve elements which are included in the mechanism.

In the drawings:

Figure 2 is a fragmentary vertical sectional view through the walls taken along line 2—2 of Figure 1, the mixing device being shown in end elevation with portions broken away more clearly to show the valve setting mechanism.

Figure 1:
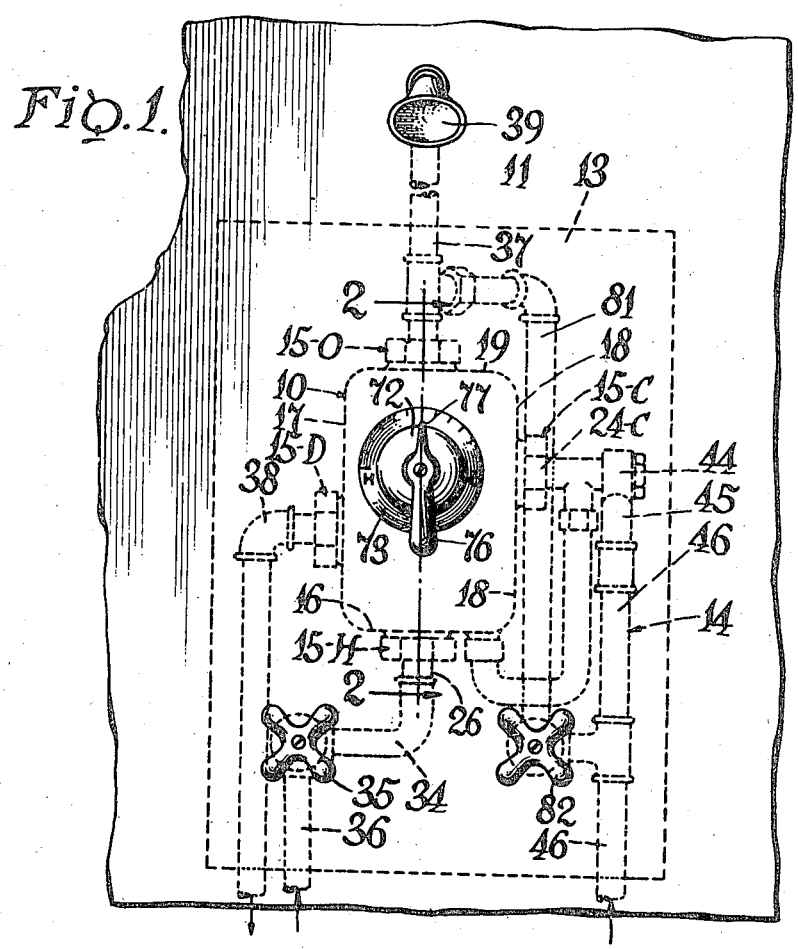
Figure 1 is a fragmentary front elevational view of the mechanism as installed in a wall for shower purposes.
Figure 4:
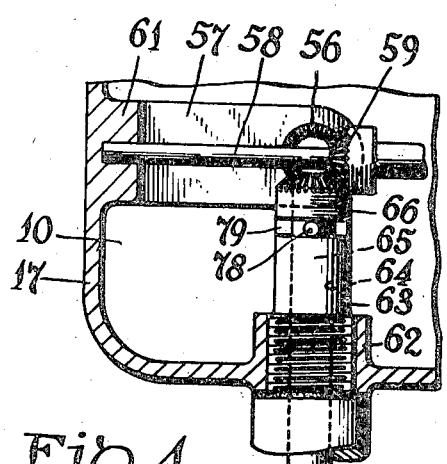
Figure 4 is a fragmentary horizontal sectional view along the line 4—4 of Figure 3.

Generally described, our invention includes a fluid mixing chamber provided with thermostatically controlled valves arranged in different zones of the chamber and automatically operative to control the temperature of the water being mixed in the chamber within a narrow temperature range selectable by a manually operable handle. At the beginning of a water mixing operation hot water is admitted to the lower zone of the chamber through a thermostatically controlled normally open hot water valve to replace residual water in the lower zone of the chamber by causing it to flow through a normally open thermostatically controlled drain valve connected to a drain pipe. Upon the temperature of the entering water reaching a predetermined degree the drain valve closes and, as the hot water rises in the intermediate zone, a cold water controlling thermostat located within this zone is immersed. With the temperature of the hot immersing water in the intermediate zone above the desired temperature a normally closed cold water valve is opened to admit cold water into the chamber to modify the temperature of the hot water until it is reduced to the desired degree. The mixed water now rises to an upper zone of the chamber and upon immersion of an outlet thermostat located in this zone a normally closed discharge valve is opened, and remains open, to provide for the passage of water at the desired temperature to a shower nozzle or tub. The thermostatic elements of the hot and cold water admission valves are operably connected to a selector handle whereby, according to personal preference, the temperature of the bath water may be predetermined within a narrow range.

When for any reason the temperature of the incoming hot water may rise excessively the thermostat of the normally open hot water valve is operative to effect suitable partial, or, if necessary, complete, closure of the valve, thus preventing water at unduly high temperature passing through the mixing chamber. On the other hand should the temperature of the water in the upper zone of the chamber for any reason fall excessively the outlet thermostat valve closes to prevent the delivery of water at chilling temperature.

During the normal operation of the mechanism, after selection of a desired temperature and upon opening a hand valve in the hot water supply line, more or less cold water, depending on the degree of opening of the automatic cold water valve, is admitted from a cold water line to the mixing chamber for admixture with the hot water to produce a mean water temperature which accords with the preselected temperature.

A branch of the cold water supply line connected thereto and to the output line of the mixing chamber by-passes cold water around the mixing chamber when a hand valve is opened so that a flow of cold water independently of the mixing device may be obtained. Should it be desired the cold water may be tempered by setting the mixing device to obtain the lowest temperature of warm water therefrom and adding it to the by-passing flow of cold water beyond the mixing chamber.

Referring to the drawings:

The water mixing chamber, designated generally as 10, is shown as located between a front wall 11 and a spaced rear wall 12 which preferably includes a panel 13 removable to provide access to mixing chamber 10 and its associated piping 14 for periodic inspection and service when necessary.

Figure 3:
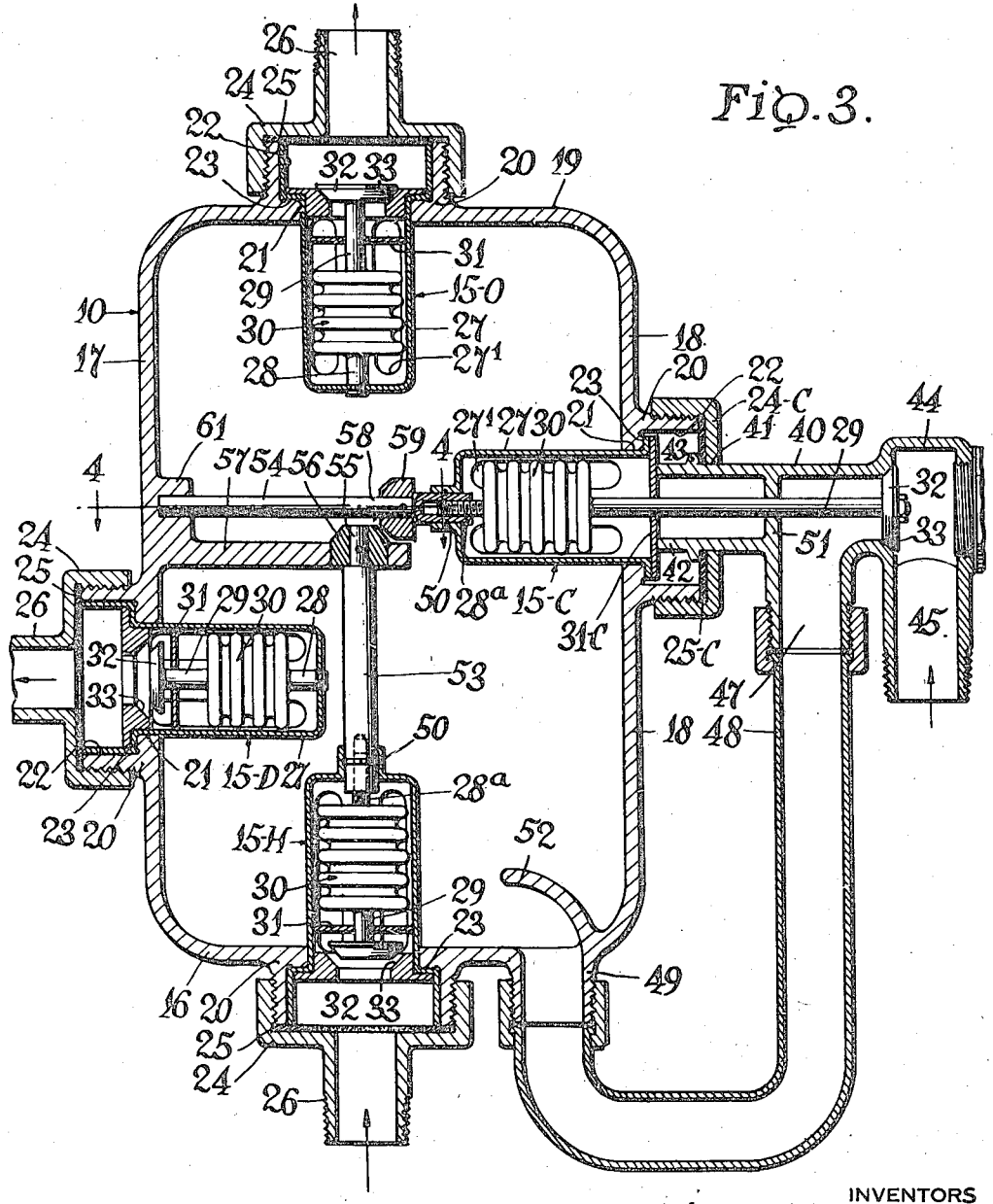
Figure 3 is a vertical sectional view along the line 3—3 of Figure 2.

The hot water inlet control unit 15—H, the drain control unit 15—D, the cold water unit 15—C and the mixed water outlet control unit 15—O are respectively mounted in the bottom wall 16, the end wall 17, the opposite end wall 18 and the top wall 19 of the chamber 10. Walls 16, 17, 18 and 19 are each formed with an identical boss 20 centrally bored and counter bored as at 21 and 22 to receive one of the units which is secured therein against a shoulder 23 by a cap nut 24 having threaded engagement with the externally threaded boss (Figure 3).

A sealing ring 25 is interposed between the outer face of each boss 20 and the inner face of cap nut 24. Each of the cap nuts for units 15—H, 15—D and 15—O is formed with a central threaded nipple 26 for the connection of the piping.

Each of the control units projects into the chamber and includes a hollow body or shell 27 slotted as at 27' for the admission of water and its circulation around a bellows type of thermostatic element 30 containing, according to standard practice, a thermosensitive fluid. The element 30 is arranged co-axially within the shell 27 and is supported by a centrally located stud projecting axially from its inner end and by a centrally located rod 29 projecting axially from its outer end, a change in the temperature of the water in which the element is immersed effecting, as the case may be, expansion or contraction of the element. The studs 28 of the units 15—D and 15—O are fixed to the end walls of the shells 30. The studs 28a of the units 15—C and 15—H are threaded for cooperation with shafts 53 and 54 later to be described. Each unit 15—D, 15—H and 15—O includes a spider 31 secured to the shell for the purpose of supporting and guiding the rod 29 in its axial movements due to the expansion and contraction of the bellows element. The unit 15—C includes a plate 31—C for a similar purpose. Each rod 29 carries at its outer end a valve head 32 for cooperation with a valve seat 33. The valve seats 33 of the units 15—H and 15—D open inwardly while the valve seats 33 of the units 15—C and 15—O open outwardly.

The hot water line 36, provided with the standard shut-off valve 35, is connected by an elbow fitting 34 to the nipple 26 of the control unit 15—H. Upon the opening of the main valve 35 water flows from the line 36 into the chamber 10, the valve element of the unit 15—H being normally open. The drain unit 15—D is connected to a drain pipe by an elbow 38. The valve element of the unit 15—D is normally open and provides for the discharge of residual cold water as well as water below a temperature of 105° F.

The lower temperature zone of the chamber 10 is normally occupied by the cold residual water. The unit 15—D is arranged at an elevation such that it is subject to the temperature of the water in the lower zone. When water admitted into the chamber 10 from the hot water line 36, displacing the residual water, reaches a temperature of the order of 105° F. the thermostat of the unit 15—D will move the valve element 32 to closed position upon its seat 33 and will hold the valve element so closed as long as the temperature is at or above 105° F., thereby shutting off the flow of water to the drain.

With the drain valve closed the hot water rises in the chamber 10 through an intermediate zone, completely submerging the thermostatic element of the drain valve 15—D and reaching a level in which the thermostatic element of the valve 15—C is partially or wholly immersed. If the temperature of the water in the intermediate zone be sufficiently high, with reference to the selected bath temperature, to require the modifying effect of added cold water the normally closed valve element of the unit 15—C will be opened to a degree proportionate to the expansion of the thermostatic element, thereby to admit cold water into the mixing chamber at a proportionate rate such that the mean temperature of the body of water in the mixing chamber will be within the narrow predetermined range.

The water rises from the intermediate zone into the upper zone where it first partially submerges the thermostatic element of the outlet valve 15—O. With the valve 15—D set to close at 105° F., as in the example assumed, the thermostatic element of the outlet valve 15—O will respond to a temperature above 105° F. and will cause the movement of the normally closed valve head 32 away from its valve seat 33, thereby permitting the flow of hot water through the shell 27 of the outlet valve with the thermostatic element in complete submergence, past the valve head and into and through line 37 leading to the tub or the shower spray nozzle 39 (Figure 1).

The cold water valve unit 15—C is mounted on the wall 18 co-axially with the boss 20 and is located athwart the intermediate and upper zones. The modified cap nut 24—C has a central opening 41 and a fitting 40 has an extension 42 which projects through the opening 39 and abuts a plate 31—C by which the flange of the shell 27 is held seated against a shoulder 23, the plate 31—C being held against the shell flange by the extension 42. A sealing ring 25—C is confined between the inner face of the cap nut 24—C and the outer face of the boss 20 and is also confined between the flat wall of the cap nut and a collar 43 formed on the extension 42, the cap nut cooperating with the collar 43 to maintain the extension 42 in the relation described.

The fitting 40 is a hollow body through which cold water flows from the supply line to the chamber 10. At its outer end the fitting 40 is formed with an enlarged head 44 having a nipple 45 connected to the cold water supply pipe 46. The fitting 40 is also formed with a nipple 47 located inwardly of the head 44 to which a J-shaped pipe 48 is connected, the lower end of the pipe 48 being connected to a nipple 49 formed on the bottom wall 16 of the chamber 10. Cold water flows from the supply pipe 46 through the fitting 40 to the pipe 48 and thence to the chamber 10, entering the chamber at its lower end and rising through the successive zones with temperature modifying effect upon the hot water within and flowing through the chamber. The seat 33 for the valve element 32 is formed upon the inner wall of the head 44 and provides for the flow of cold water as described. The rod 29 which carries the valve element 32 and effects its opening and closing movement is closely fitted for sliding movement in alined openings of the plate 31—C and a web 51 formed within the fitting 40 and separating the water conducting part of the fitting from the extension 42. The web 51 serves to block the passage of water into the extension 42, the closeness of the fit of the rod 29 in the openings in the plate 31—C and the web 51 preventing the passage of any substantial quantity of water through the openings.

It is desirable that the flow of cold water entering chamber 10 be prevented from directly reaching unit 15—C and for this reason a curved deflector plate 52 is formed in chamber 10 above the opening in nipple 49 to deflect and distribute the incoming cold water and cause its rapid and uniform mixture with the hot water in the lower zone.

In order that the temperature of the bath water may be varied to suit individual preferences the control units 15—H and 15—C may be set to provide a flow of water of substantially constant temperature. Accordingly the threaded studs 28a of units 15—H and 15—C cooperate with internally threaded recesses in the adjacent ends of the shafts 53 and 54, whereby upon a partial rotation of these shafts in either direction the thermostatic elements of the units are adjusted to respond coordinately to higher or lower degrees of mean water temperature within the chamber 10.

The outer end of the vertical shaft 53 is journaled in the shell 27 of the unit 15—H and its reduced inner end 55 carries a bevel gear 56, the hub of which is journaled in an opening in an arm 57 projecting from the wall 17. The outer end of the horizontal shaft 54 is journaled in the shell 27 of the unit 15—C and its reduced inner end 58 carries a bevel gear 59 slightly spaced to the right of bevel gear 56 in non-meshing relation (Figure 3). The shaft 54 extends over the shaft 53 and has a journal in a boss 61 formed on wall 17 above the arm 57. Any suitable means 60, such as the well-known split rings fitted in opposed grooves in the shafts and the shell may be provided to prevent axial shifting movement of the shafts.

The front wall of the chamber 10 is formed with a boss 62 internally threaded to receive an externally threaded sleeve 63 in the central bore 64 of which a shaft 65 is journaled. The axis of the shaft 65 is directed toward the point of intersection of the axes of the shafts 53 and 54. At its inner end the shaft 65 carries a bevel gear 66 which meshes with the non-meshing gears 56 and 59 whereby its rotative movement causes rotative movement of gears 56 and 59 and coordinated changes in the setting of the thermostat elements 30 of the units 15—H and 15—C. A collar 67 is carried by the shaft 65 intermediate its ends and is rotatively mounted against the inner face of a counter-bore 68 formed in the outer end of sleeve 63. A packing ring 69 held against the collar 67 by the inner end of a hollow nut fitting 71 screwed into the internally threaded outer end of sleeve 63 prevents axial shifting of the shaft 65 and leakage of water between the shaft and bore.

A cup 72 having a flange 73 is provided with a central opening so that the cup may be pushed over the threaded outer end of the fitting 71 with its flange 73 in frictional engagement with the front wall 11, the cup being secured in position by a ring nut 74 screwed on the threaded outer end of fitting 71. The cup 72 covers an opening 75 in the wall 11 (Figure 1), through which the sleeve 63 projects. The flange 73 of the cup 72 is provided with suitable gage marks to indicate the direction and extent of turning movement of the shaft 65 required to raise or lower the temperature of the bath water to the substantial degree preferred. A handle 76 secured to the outer end of the shaft 65 is formed with a finger 77 directed toward the markings on the flange 73 to enable the selection of the desired temperature of bath water.

A radially projecting pin 78 is provided at the inner end of the shaft 65 and the sleeve 63 at its inner end is formed with a recess 79, the end walls of which provide shoulders for engagement with the pin 78. Thereby the turning movement of the shaft 65 is limited in order to prevent excess rotative movement, in either direction, of the shafts 53 and 54 with resultant damage to the thermostatic elements of the units 15—H and 15—C.

In order to enable cold water baths, a shunt pipe 81 is preferably arranged between the cold water supply line 46 and the outlet pipe 37. With the main valve 35 in the hot water line closed, cold water may be shunted to the outlet pipe 37 through the pipe 81 which is provided with a manual controlling valve 82.

When the handle 76 is turned the gear 66 effects the rotation of the shafts 53 and 54 with resultant axial movement of the studs 28a. The bellows element 30 of the unit 15—C is under tension and the movement of the attached stud 28a in one direction increases the tension and in the other direction decreases it. The valve element 32 of the unit 15—C remains closed during the tensional adjustment of the bellows element 30. In the case of the unit 15—H the movement of the stud 28a effects a body movement of the bellows element, thereby to position the valve element 32 nearer to or further from its seat.

It will be apparent that if the movement of the handle 76 be from a lower temperature position to a higher temperature position the resistance of the thermostatic element 30 of the unit 15—C to expansion under the heat of the water will be proportionately increased and the spacing, relatively to its seat, of the valve element 32 of the unit 15—H will be proportionately increased. Conversely if the movement of the handle 76 be from a higher temperature position to a lower temperature position the resistance of the element 30 of the unit 15—C to expansion under the heat will be proportionately decreased and the spacing, relatively to its seat, of the valve element 32 of the unit 15—H will be proportionately decreased.

From the foregoing it will be apparent that after moving handle 76 to select the desired temperature of bath water, and upon opening the hot water valve 35, cold water flows through the drain unit 15—D until its valve element closes, hot water entering chamber 10 through unit 15—H rises in the chamber successively to immerse the thermostatic elements of the units 15—C and 15—O, cold water is automatically admitted to and mixed with the hot water in the chamber to maintain a flow of bath water through unit 15—O of substantially the desired temperature, upon an excessive rise in the temperature of the incoming hot water the unit 15—H is operative to shut off the supply of hot water, and upon an excessive drop in the temperature of the water the unit 15—O is operative to shut off the supply of water to the outlet pipe and the unit 15—D is operative to by-pass the cold water to the drain pipe.

It will also be apparent that fluctuations of the temperature of the water in either or both of the hot and cold water supply lines will be automatically compensated, thereby to insure that the bath water will be within the narrow range of predetermined temperature, that is to say, substantially of the temperature predetermined.

In connection with the cold water baths in which the water from the cold water supply line passes to the tub or shower through the shunt pipe 81 it may, on occasion, be found desirable to raise somewhat the temperature of the water issuing from the cold water line in order to avoid any undue chilling effects. This can be accomplished by using the water mixing mechanism in combination with the shunt pipe 81, for example, by setting the control handle 76 at the lowest hot water temperature for which the mechanism is available. In this way cold water will be delivered to the bath or shower at a temperature above that in the cold water supply line and such that the chilling effects will be eliminated.

It will be noted that the several valve mechanisms 15—C, 15—D, 15—H and 15—O and their associated parts are structurally independent units. It will therefore be apparent that upon removal of the panel 13 any of the piping connections may be readily dismantled to enable the removal, for the purpose of inspection, repair or parts replacement, of the associated thermostatic valve mechanism; and that any valve unit may be so removed independently of the remaining units and without disturbing their arrangement in operative relation in the chamber 10.

We claim:

1. A unitary mechanism for effecting the regulation and automatic control of the temperature of heated water for bath purposes comprising a chamber for use in combination with hot and cold water supply lines and having a hot water inlet port at its lower end, a cold water drain port formed in a side wall above the hot water inlet port, a pipe extending from the cold water supply line and communicating with the lower end of the chamber at one side of the hot water inlet port and a hot water discharge port at its upper end, a fitting connected to said pipe and to the cold water supply line and having a port establishing communication between said supply line and said pipe, structurally independent valve units associated with the several ports and each comprising a shell, a bellows type thermostatic element arranged within the shell and a valve head carried by the element and cooperating with the port with which the unit is associated, the shells severally projecting into the chamber and being removably fitted to the walls of the chamber whereby any of them may be independently removed for inspection, repair or replacement, the shells each having openings through which the water in the chamber may circulate in relation to the thermostatic elements, the hot water admission valve unit being arranged in a lower zone of the chamber with its valve element normally open, the cold water drain valve unit being arranged above the hot water admission valve unit and adjacent the lower zone and an intermediate zone of the chamber and having its valve element normally open, the cold water admission valve unit being arranged above the cold water drain valve unit and adjacent the intermediate zone and an upper zone of the chamber and having its valve element normally closed and the hot water discharge valve unit being arranged in the upper zone of the chamber and above the cold water admission valve unit and having its valve element normally closed, the thermostatic elements of the several units being responsive to hot water in effecting the movements of their several valve elements in order to provide for a definite temperature of the hot water issuing from the hot water discharge unit, increases in water temperature within the chamber causing movements of the valve elements of the hot water admission valve unit and the cold water drain valve unit toward their seats and causing movements of the valve elements of the cold water admission valve unit and the hot water discharge valve unit away from their seats.

2. A mechanism as set forth in claim 1 wherein the thermostatic element of the cold water admission valve unit is under tension and mechanism is provided for the simultaneous regulation of the tension of said thermostatic element and of the position of the thermostatic element of the hot water admission valve unit, thereby to enable selection and predetermination of the temperature of the water issuing from the hot water discharge unit.

3. A mechanism as set forth in claim 1 in combination with a shunt pipe between the cold water supply line and the line for the discharge of hat water from the chamber, the shunt pipe having a manually operated control valve.

CLIFFORD R. SPENCER.
DONALD G. WILHELM.

No references cited.